United States Patent
Tunnell et al.

(10) Patent No.: US 10,269,010 B2
(45) Date of Patent: Apr. 23, 2019

(54) METHOD FOR REPLACING TRADITIONAL PAYMENT AND IDENTITY MANAGEMENT SYSTEMS AND COMPONENTS TO PROVIDE ADDITIONAL SECURITY AND A SYSTEM IMPLEMENTING SAID METHOD

(71) Applicant: NXT-ID, Inc., Shelton, CT (US)

(72) Inventors: Charles David Tunnell, Palm Bay, FL (US); Justin Mitchell, Melbourne, FL (US); Gino Pereira, Oxford, CT (US); Jacob Zurasky, Orlando, FL (US)

(73) Assignee: NXT-ID, INC., Shelton, CT (US)

( * ) Notice: Subject to any disclaimer, the term of this patent is extended or adjusted under 35 U.S.C. 154(b) by 407 days.

(21) Appl. No.: 15/252,468

(22) Filed: Aug. 31, 2016

(65) Prior Publication Data

US 2017/0132613 A1     May 11, 2017

Related U.S. Application Data

(63) Continuation of application No. 14/049,175, filed on Oct. 8, 2013, now abandoned.

(60) Provisional application No. 61/710,826, filed on Oct. 8, 2012.

(51) Int. Cl.
    *G06Q 20/34*      (2012.01)
    *G06Q 20/36*      (2012.01)
    *G06F 21/62*      (2013.01)

(52) U.S. Cl.
    CPC ..... *G06Q 20/3674* (2013.01); *G06F 21/6245* (2013.01); *G06Q 20/363* (2013.01); *G06Q 20/357* (2013.01); *G06Q 20/3552* (2013.01)

(58) Field of Classification Search
    CPC ................................. G06Q 20/3552
    See application file for complete search history.

(56) References Cited

U.S. PATENT DOCUMENTS

| | | |
|---|---|---|
| 5,221,838 A | 6/1993 | Gutman |
| 6,026,379 A | 2/2000 | Haller |
| 6,212,634 B1 | 4/2001 | Geer, Jr. |
| 6,250,557 B1 | 6/2001 | Forslund |
| 6,270,011 B1 | 8/2001 | Gottfried |
| 6,938,019 B1 | 8/2005 | Uzo |
| 7,024,396 B2 | 4/2006 | Woodward |
| 7,059,531 B2 | 6/2006 | Beenau |

(Continued)

*Primary Examiner* — A. Hunter Wilder
(74) *Attorney, Agent, or Firm* — Beusse Wolter Sanks & Maire, PLLC; John L. DeAngelis

(57) ABSTRACT

An electronic wallet system that protects payment accounts, identification and other personal information found within a typical wallet with a secure electronic vault (first) device that can be part of a physical wallet, insert to a wallet, or in other embodiments, wearable/portable devices. A unique biometrically enabled multi-factor authentication process ensures only owners of the information can copy the information to the device or retrieve it thereafter. Authenticated users may then select payment, identification, medical or virtually any private information via touch display or voice command on the vault or on another (second) device that operates in conjunction with the vault. The second device comprises, for example, a programmable card with dynamic magnetic stripe, cell phone, or other wearable technology, that initiates and processes a payment and/or transfer of private information.

26 Claims, 14 Drawing Sheets

(56) References Cited

U.S. PATENT DOCUMENTS

| | | |
|---|---|---|
| 7,303,120 B2 | 12/2007 | Beenau |
| 7,314,164 B2 | 1/2008 | Bonalle |
| 7,314,165 B2 | 1/2008 | Bonalle |
| 7,318,550 B2 | 1/2008 | Bonalle |
| 7,325,724 B2 | 2/2008 | Bonalle |
| 7,341,181 B2 | 3/2008 | Bonalle |
| 7,357,310 B2 | 4/2008 | Calabrese |
| 7,360,689 B2 | 4/2008 | Beenau |
| 7,363,504 B2 | 4/2008 | Bonalle |
| 7,438,234 B2 | 10/2008 | Bonalle |
| 7,445,149 B2 | 11/2008 | Bonalle |
| 7,451,924 B2 | 11/2008 | Bonalle |
| 7,451,925 B2 | 11/2008 | Bonalle |
| 7,494,058 B2 | 2/2009 | Bonalle |
| 7,497,375 B2 | 3/2009 | Bonalle |
| 7,500,616 B2 | 3/2009 | Beenau |
| 7,505,941 B2 | 3/2009 | Bishop |
| 7,506,806 B2 | 3/2009 | Bonalle |
| 7,506,818 B2 | 3/2009 | Beenau |
| 7,506,819 B2 | 3/2009 | Beenau |
| 7,510,115 B2 | 3/2009 | Bonalle |
| 7,523,860 B2 | 4/2009 | Bonalle |
| 7,530,493 B2 | 5/2009 | Bonalle |
| 7,533,827 B2 | 5/2009 | Bonalle |
| 7,543,738 B1 | 6/2009 | Saunders |
| 7,578,448 B2 | 8/2009 | Beenau |
| 7,594,612 B2 | 9/2009 | Bonalle |
| 7,597,265 B2 | 10/2009 | Bonalle |
| 7,637,434 B2 | 12/2009 | Beenau |
| 7,639,116 B2 | 12/2009 | Saunders |
| 7,668,750 B2 | 2/2010 | Bonalle |
| 7,690,577 B2 | 4/2010 | Bonalle |
| 7,705,732 B2 | 4/2010 | Bishop |
| 7,735,725 B1 | 6/2010 | Bishop |
| 7,740,168 B2 | 6/2010 | Hammad |
| 7,746,215 B1 | 6/2010 | Bishop |
| 7,761,374 B2 | 6/2010 | Sahota |
| 7,793,845 B2 | 9/2010 | Bonalle |
| 7,810,165 B2 | 10/2010 | Hammad |
| 7,814,332 B2 | 10/2010 | Beenau |
| 7,818,264 B2 | 10/2010 | Hammad |
| 7,819,322 B2 | 10/2010 | Hammad |
| 7,886,157 B2 | 2/2011 | Beenau |
| 7,889,052 B2 | 2/2011 | Beenau |
| 7,945,238 B2 | 5/2011 | Baker |
| 7,954,706 B2 | 7/2011 | Calabrese |
| 7,988,038 B2 | 8/2011 | Beenau |
| 8,001,054 B1 | 8/2011 | Peart |
| 8,016,191 B2 | 9/2011 | Bonelle |
| 8,074,889 B2 | 12/2011 | Beenau |
| 8,078,140 B2 | 12/2011 | Baker |
| 8,087,582 B2 | 1/2012 | Hammad |
| RE43,157 E | 2/2012 | Bishop |
| 8,121,942 B2 | 2/2012 | Carlson |
| 8,121,945 B2 | 2/2012 | Rackley |
| 8,121,956 B2 | 2/2012 | Carlson |
| 8,145,568 B2 | 3/2012 | Rackley |
| 8,160,959 B2 | 4/2012 | Rackley |
| 8,313,037 B1 | 11/2012 | Humphrey |
| 8,376,239 B1 | 2/2013 | Humphrey |
| 8,690,059 B1 | 4/2014 | Wallner |
| 8,977,569 B2 | 3/2015 | Rao |
| 2002/0023215 A1 | 2/2002 | Wang |
| 2002/0143655 A1 | 2/2002 | Elston |
| 2002/0038287 A1 | 3/2002 | Villaret |
| 2002/0077993 A1 | 6/2002 | Immonen |
| 2002/0107755 A1 | 8/2002 | Steed |
| 2002/0143634 A1 | 10/2002 | Kumar |
| 2002/0169719 A1 | 11/2002 | Dively |
| 2002/0179704 A1 | 12/2002 | Deceton |
| 2002/0191816 A1 | 12/2002 | Maritzen |
| 2003/0024979 A1 | 2/2003 | Hansen |
| 2003/0061170 A1 | 3/2003 | Uzo |
| 2003/0154139 A1 | 8/2003 | Woo |
| 2004/0078328 A1 | 4/2004 | Talbert |
| 2005/0131838 A1 | 6/2005 | Woodward |
| 2008/0059379 A1 | 3/2008 | Ramaci |
| 2009/0037173 A1* | 2/2009 | Hansen ............... G06Q 20/341 704/246 |
| 2009/0143104 A1 | 6/2009 | Loh |
| 2009/0235074 A1 | 9/2009 | Salgarelli |
| 2011/0255133 A1 | 10/2011 | Pastor |
| 2012/0191612 A1 | 7/2012 | Spodak |
| 2014/0073979 A1* | 3/2014 | Inciardi ............... G06F 19/00 600/509 |

* cited by examiner

METHOD FOR REPLACING TRADITIONAL PAYMENT AND IDENTITY MANAGEMENT SYSTEMS AND COMPONENTS TO PROVIDE ADDITIONAL SECURITY AND A SYSTEM IMPLEMENTING SAID METHOD

CROSS REFERENCE TO RELATED APPLICATIONS

This patent application is a continuation application of and claims the benefit of the non-provisional patent application filed on Oct. 8, 2013, assigned application Ser. No. 14/049,175, and entitled Method for Replacing Traditional Payment and Identity Management Systems and Components to Provide Additional Security and a System Implementing said Method, which further claims the benefit of the U.S. provisional patent application filed on Oct. 8, 2012 and assigned Application No. 61/710,826, both of which are incorporated herein.

FIELD OF THE INVENTION

The present invention relates to the field of digital and electronic wallets, specifically methods and related apparatuses for securing private information found within a typical wallet, such as payment accounts, payment cards, identification information, medical information and records, and virtually any private information desired to be carried by a person.

BACKGROUND OF THE INVENTION

Prior art digital wallets focus on financial transactions, attempting to replace current technologies of credit and debit cards and the like with mostly electronic commerce (e-commerce) and similar methods and devices. Likewise, security concerns for most digital wallet technologies are focused primarily on the transaction between the customer, merchant and banking institutions.

The term "digital wallet" is used loosely to describe a broad spectrum of methods and devices to perform electronic commerce (e-commerce). Digital wallets refer to software that resides on the consumer's personal computer (PC) or other web-enabled devices that enable a user to select a payment account digitally. Digital wallets require an internet connection. Conversely, electronic wallets refer to electronic methods to allow a user to select a payment account locally, on some physical electronic device. Most digital wallet technologies involve software that resides on the consumer's personal computer (PC) or other web-enabled devices. Most browsers now support digital wallets. Digital wallet software spans methods to improve consumer's ability to purchase goods and services from on-line e-retailers (the "transaction") to methods to keep personal information private (the "security").

Features and benefits to the consumer to purchase goods and services over internet based e-commerce are well known. However, many shortcomings have limited the use and acceptance of digital wallet software solutions as the technology migrates to mobile devices. The chief issue with mass consumer acceptance of "mobile money" solutions involves securing private information on the devices as well as securing authentication information during the transaction itself. As evident in recent reviews, digital wallet technologies on cell phones will be further challenged to fully secure mobile devices. Security holes within operating systems and firewalls have caused numerous false starts to an already skeptical consumer market. Even if security concerns can be overcome, the perception of the public to utilize cell phones that have open access via the internet is questionable. In this day of rampant identity theft, consumers are understandably cautious to embrace any technology that houses or transmits their private information over electronic mediums without "assured security."

Various methods have been used to secure financial transactions over the internet including encrypting the information stored locally on a device as well as the information transmitted to merchants and on to banking institutions. Since encryption alone does not solve the issue of authenticating, that is, is the individual making the purchase is indeed the individual qualified to make the purchase (e.g. the "card holder"), various methods to "authenticate" the user have arisen, such as biometrics. "End-to-end" biometric authentication is great for a long-term solution (once all security issues are fully addressed to the satisfaction of consumers), but does nothing for the current paradigm of magnetic stripe credit and payment cards that are so prevalent in society. Furthermore, a simple biometric key that authenticates with a server in the cloud does nothing to address hacking of the device and using the captured bio-key improperly "remotely" over the internet.

SUMMARY OF THE INVENTION

One embodiment of the invention comprises a method to send private information to authenticated devices securely to replicate the information in a format that supports a specific transaction method, and thereby reduce the number of devices, cards and other methods a user must carry, while improving security to protect private information.

The invention also addresses the broader issue of securing and replacing the number and variety of devices holding personal information within a wallet, such as identification information, medical information, and payment account devices, while conforming to current transaction methods, such as those utilizing magnetic stripes and/or NFC (near-field communications) for financial transactions and other known methods for HIPPA-controlled medical documents.

One embodiment of the invention focuses on security between a secure electronic payment and identity management device (referred to as a first device) and second devices that facilitate a transaction per a conventional transaction method, such as a dynamically programmable card and/or a mobile device such as a cell phone. This dual device relationship arguably addresses where most theft and fraud occurs, prior to the point-of-sale (POS), replacing payment transaction accounts and other private information with one or more standard devices that can perform the transaction over standard communications, only after being authorized to receive the private information from the first device, such as a private electronic vault or an electronic wallet. Unlike current methods that hold and transfer information (such as payment cards and other devices that support USB (universal serial bus), infrared, magnetic stripe, NFC (near field communications), contact/contactless EMV (Europay, MasterCard and Visa)), this invention requires a second device to authenticate with the secure electronic payment and identity management device before a transaction can occur, even if the information is transferred via one of these communication methods directly to a POS terminal directly from the private electronic wallet or via an authenticated second device. Thus, the second device can be "dumb" most of the time, completely void of any personal information, while the private electronic wallet device holds all private data safe and secure, and only releases it to secondary device(s) or POS terminals after a full authentication has occurred.

The present invention provides unique alternatives to reducing the number and variety of devices holding personal information within a wallet while increasing security of the user authentication process and the consumer transaction. To conform to current payment methods, rather than requiring any special software or equipment modifications by a merchant or bank, this invention reduces the number of payment devices and methods carried by a user and increases security while working within the paradigm of the current magnetic stripe readers, contactless NFC and EMV systems, and bar code payment methods that are so prevalent within society today. Further, this invention addresses chief security concerns not only with physical electronic wallets, but also digital wallets on mobile devices such as cell phones, which desperately need authentication and security solutions to overcome current mobile payment security deficiencies and user perceptions.

This invention improves security by requiring authentication between a user and two devices (i.e., the first and second devices) prior to any transaction taking place. The first device is an electronic vault device that can be physically part of a physical wallet, insert to a wallet, or in other embodiments, wearable/portable devices such as money clips, key chain accessories, watches, dongles, cell phone accessories, or any other device typically carried or worn by an individual. The first device requires unique user-configurable, biometrically enabled multi-factor authentication to ensure only owners and their private information can be copied into the secure vault wallet device. Authenticated users may then select payment information, identification information, medical information or virtually any private information via touch display or voice command on the first device, or alternatively on the second device after a successful authentication.

Encrypted information can be then sent from the first device to the second device, after successful authentication. The second device can comprise a programmable card having a dynamic magnetic stripe, a cell phone, or a display device displaying a payment barcode to replicate the selected private information stored on the first device. This method and attendant devices reduces the number of cards and other devices a user must carry. The second device may include mobile devices such as cell phone, tablets and laptops, or fixed devices such as desktop PCs and the like. The second device then acts as a conduit to provide private information via other communication methods such as NFC or dynamic magnetic stripe for financial transactions, and HIPPA controlled communication methods for private medical documents.

BRIEF DESCRIPTION OF THE DRAWINGS

The forgoing and other features of the present inventions will be apparent to one skilled in the art to which the present inventions relate upon consideration of the following description of the invention with reference to the accompanying drawings, herein:

FIG. 6 describes another embodiment of the mechanical design of this invention to not only hold a powered card, but also communicate with it and charge its battery by aligning physical contacts or embedded electrical components such as antenna, coils, or the like.

FIG. 26 describes a user interface (UI) concept to manage personal information and cards within a private electronic wallet from an app on a second device, such as mobile and fixed devices like cell phones, tablets, laptops, PCs and the like.

DETAILED DESCRIPTION OF THE PREFERRED EMBODIMENTS

Before describing in detail the particular methods and apparatuses related to replacing traditional payment and identify management systems and components with methods and components that provide additional levels of security, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments. The presented embodiments are not intended to define limits as to the structures, elements or methods of the inventions, but only to provide exemplary constructions. The embodiments are permissive rather than mandatory and illustrative rather than exhaustive.

The present invention differs from other "digital wallets" in that other wallets are more focused on solutions that rely upon an internet connection to perform card/account selection and/or transaction. In contrast, this invention is focused on replacing the number and variety of devices holding personal information within a physical wallet, and replication of their functionality onto a secondary authenticated device that conforms to current common communication interfaces for private methods such as HIPPA controlled communication methods for private medical documents and payment methods such as NFC or dynamic magnetic stripe.

System Overview

Figure 1:
FIG. 1 is a conceptual drawing of the private electronic vault with secondary authenticated device, in this case a powered card.
Figure 3:
FIG. 3 illustrates mechanical designs with the display located at the left 115 or the right 116 sides of the inside of the wallet.
Figure 3:
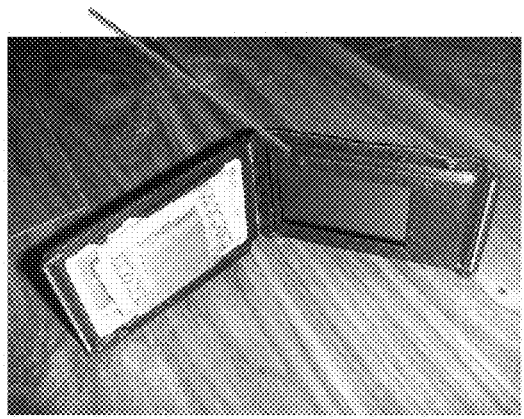
Figure 4:
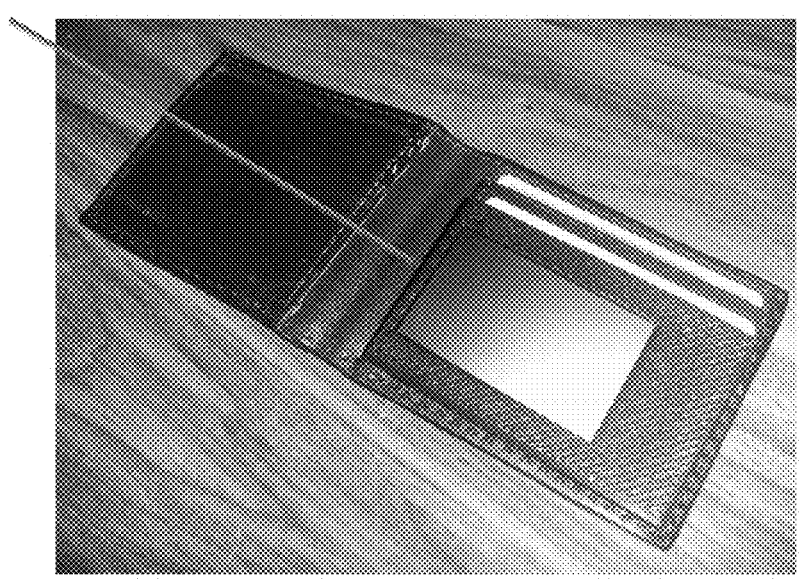
FIG. 4 is a mechanical design of the personal identity wallet as an insert 117 to a conventional wallet.

This invention improves security by requiring authentication between a user and two devices as shown for example in FIG. 1 (referred to herein as first and second devices) prior to a transaction taking place. The first device, which may comprise and be referred to as an electronic vault device, personal identity vault, private electronic vault, a private electronic wallet, a secure electronic payment and identity management device, a secure electronic payment and identification device or system, a next generation payment and personal identity wallet, and a next generation payment and personal identity device, can be physically part of a physical wallet as shown for examples in FIGS. 2 and 3, 102 and 104, insert to a wallet as shown in FIG. 4, 106, or in other embodiments, wearable/portable devices such as money clips, key chain accessories, watches, dongles, cell phone accessories, or any other device typically carried or worn by an individual. This personal identity vault device requires unique biometrically enabled multi-factor authentication to ensure only owners and their private information can be copied into the vault device.

Authenticated users may then select credit, debit, identification, medical or virtually any private information via touch display or voice command on the first device, or alternatively on the second device that connects to the first device. Encrypted information can be then sent from the first device to the second (authenticated) device, such as a programmable card with dynamic magnetic stripe. In any case, the format of the information in the second device is selected to replicate the desired transaction method. In one embodiment, for example, the second device can be pre-programmed to be any card type, such as a stand-alone multi-card, or the second device can sit within the electronic wallet device, which acts as a security system for programming the dynamic card. Information can be "zeroized", writing 1's and 0's over memory iteratively in random pattern, after one use, a preconfigured number of uses, or after a timer has expired.

A user may select a card via the touch interface or voice command on the first device or alternatively on an authenticated second device with display interfaces (e.g. cell phone, tablet, PC, etc.), and configure the second device to function just like a copied device. Alternatively, the first device (e.g., private vault electronic wallet device) and the authenticated second device can be used with other mobile payment forms such as NFC, EMV, RFID, infrared, acoustic, and QR Codes in some embodiments. Logos, picture of the front and back, signature and even bar codes can be displayed on the sunlight readable display of the first or second devices such that secure electronic payment and identification system can uniquely support all common methods of payment currently supported at point of sale (POS) positions around the world. Other security methods such as a physical signature on the back of a payment device can also be supported.

Mechanical Options

Figure 2:
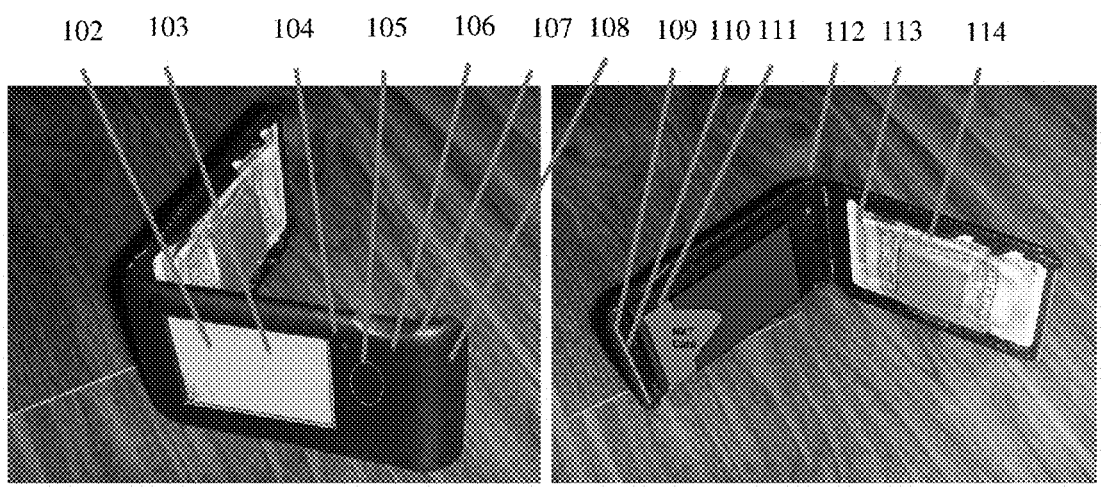
FIG. 2 is a mechanical design of the invention configured with the display of the private identity vault device on the outside of the wallet.

The private electronic vault can encompass many embodiments spanning varying mechanical configurations. As shown in FIG. 1, one embodiment consists of a standalone private electronic vault 100 with secondary authenticated device, in this case a powered card 101 that can be located anywhere with the vault. FIG. 2 describes a mechanical design of the invention configured with the display of the private identity vault device embedded in the wallet and viewable on the outside of the wallet. Features of this and any of the embodiments of this invention may include, as options, a display 102 that can be inserted into a wallet or embedded into an carried or worn device, a touch panel overlay 103, a battery indicator 104, a power on/off button 105, a microphone with exposure through the enclosure for appropriate acoustics 106, soft or hard material 107 appropriate for gripping the wallet and/or protecting other cards within the wallet such as blocking/attenuating signals to protect RF cards within, curved design 108 to conform to wearing in a rear or front pocket of a person's clothing, magnetic clasp 109 that keeps the wallet closed until opened, magnetic switch 110 that turns the electronic wallet on and off as the wallet is opened, an area for a secondary device 111, a hinge or fold mechanism 112, areas and/or folds 113 for other cards and/or receipts, and/or a money clip 114.

Another embodiment of the mechanical design of this invention is to place the display inside the wallet. FIG. 3 illustrates this concept with the display located at the left 115 or the right 116 sides of the inside of the wallet.

Figure 5:
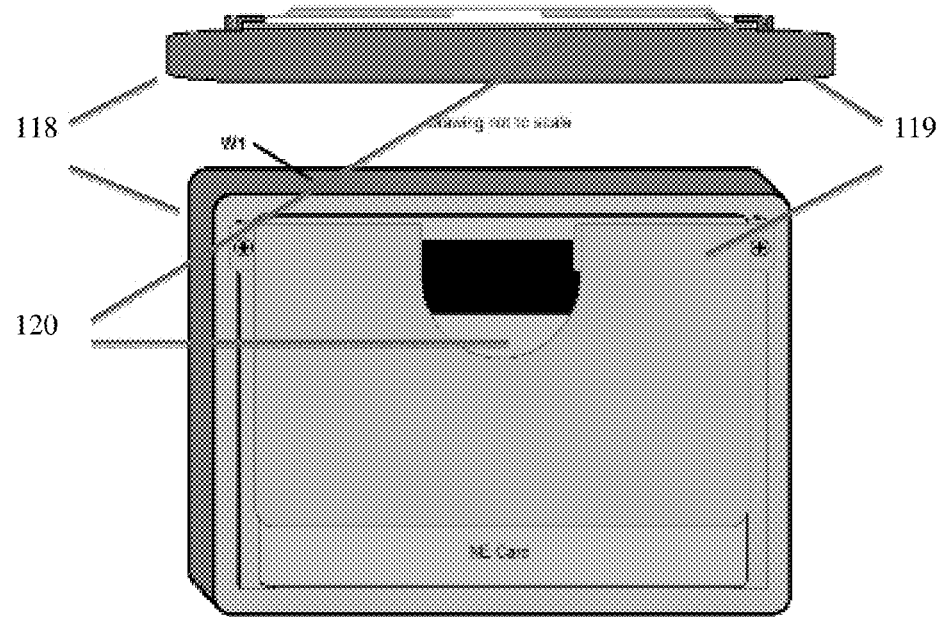
FIG. 5 is a mechanical design of a standalone personal identity vault with an optional clip for inserting into a conventional wallet.

Another embodiment of the mechanical design of this invention is to provide the private electronic wallet as an insert 117 to a conventional wallet as shown in FIG. 4. FIG. 5 describes the enclosure 118 of a standalone configuration that stores the display and electronics of the private electronic vault, along with an attachment 119 that serves as a dual purpose as a storage method for a powered card 120 and an insert 119 to hold the device in place inside a pocket of a conventional wallet.

Figure 6:
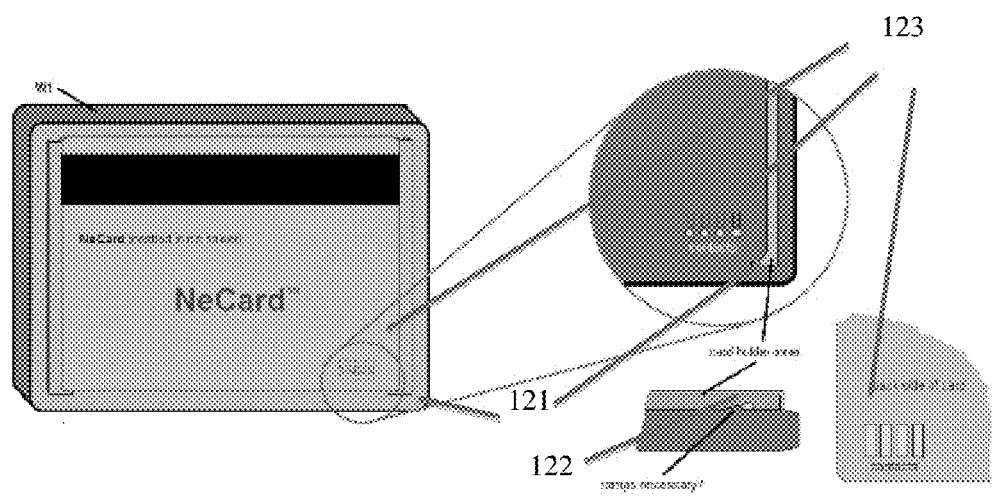

Another embodiment of the mechanical design of this invention described in FIG. 6 is to not only hold a card or powered card with guide 121 and ramp 122 features, but also communicate with a powered card and charge its battery by aligning physical contacts 123 or embedded electrical components (not shown) such as antenna, coils, or the like.

Figure 7:
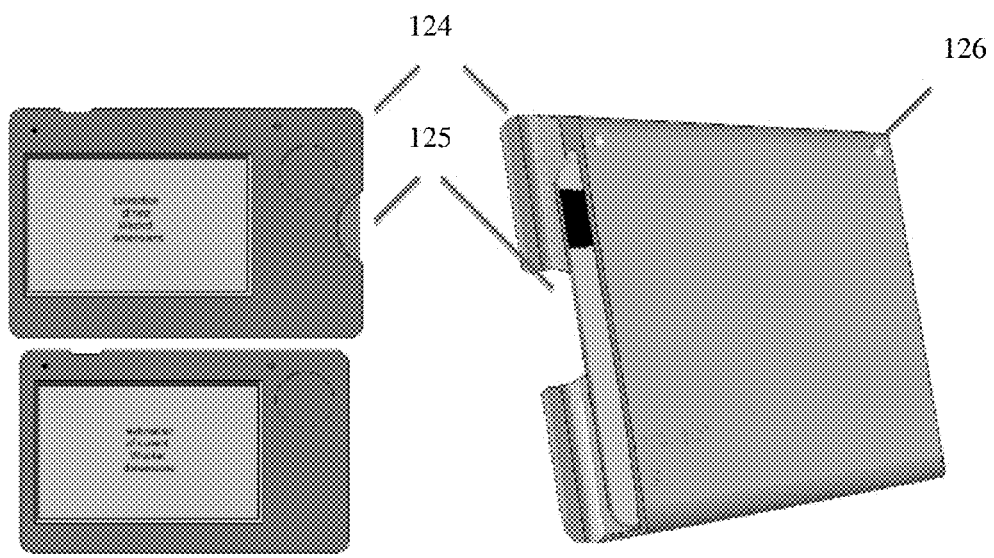
FIG. 7 is a mechanical design of a standalone private electronic wallet with optional enclosed card.
Figure 8:
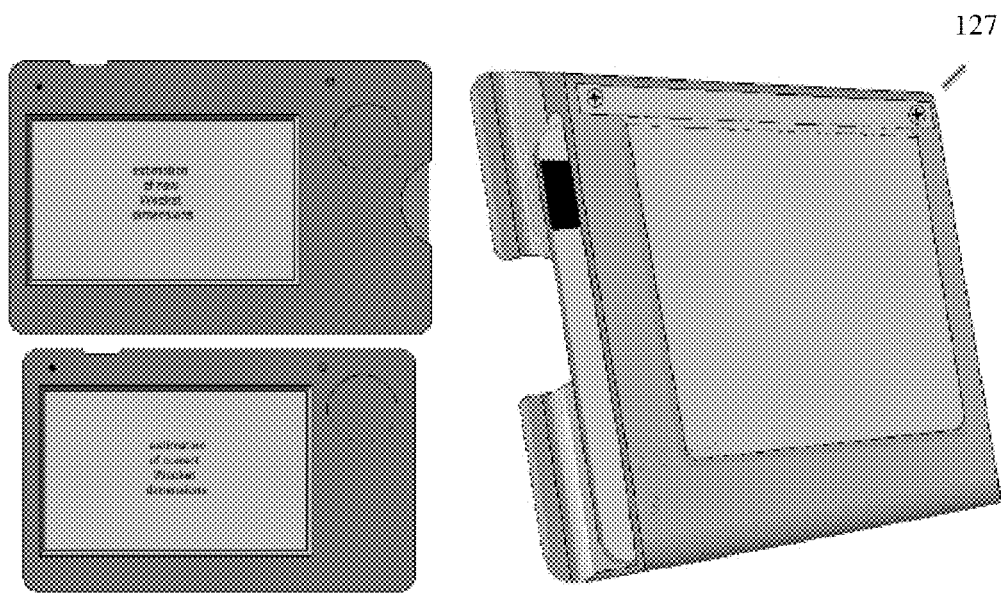
FIG. 8 is a mechanical design of a standalone private electronic vault with an optional enclosed card and clip for insertion into a conventional wallet.
Figure 9:
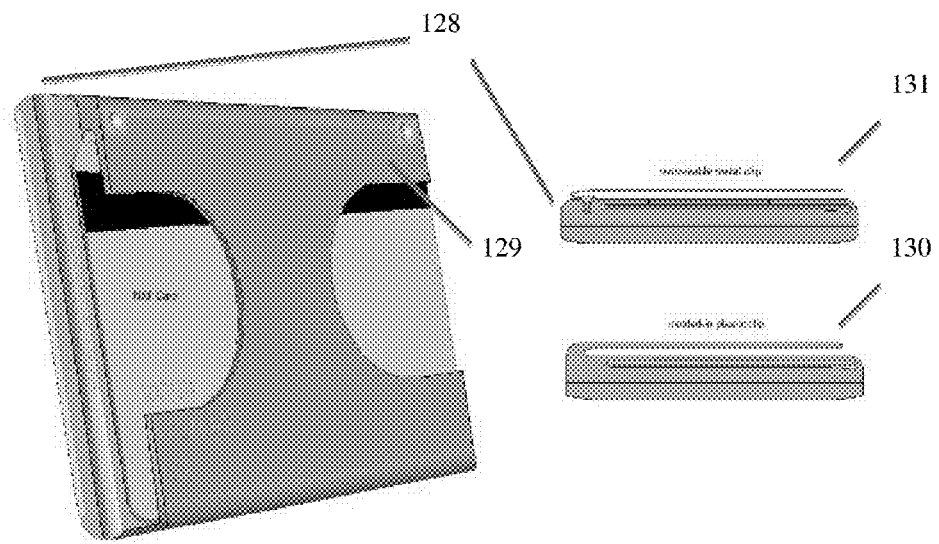
FIG. 9 is a mechanical design of a standalone private electronic vault with an optional open card and clip for insertion into a conventional wallet.
Figure 10:
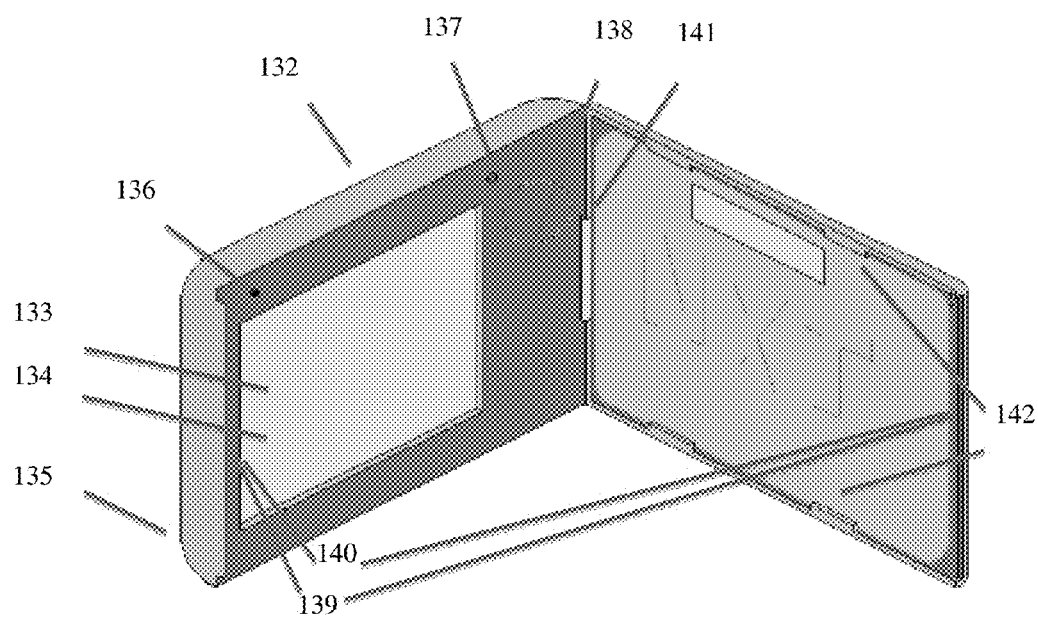
FIG. 10 is a mechanical design of a clamshell wallet with private electronic vault embedded in the wallet (part of the wallet) with an optional enclosed card.

Other embodiments include standalone private electronic wallet 124 with optional enclosed card 125 using molded guides 126 as shown in FIG. 7, optional removable insert 127 as shown in FIG. 8, an open version of the private electronic vault 128 where the molded guide is open 129 to allow easier grip to a card, and a clip may be either molded 130 or removable 131. These standalone embodiments contrast to another clamshell design as shown in FIG. 10, but may still possess each of the optional features such as a hard or soft case 132, display 133, touch screen 134, modern design for comfort such as tapered corners and sides 135, microphone 136, battery indicator 137, power button 138, magnetic clasp 139 and/or magnetic switch 140, hinge 141, card holders 142, and/or money clip (not shown on this drawing).

Electronic Hardware Components

Figure 11:
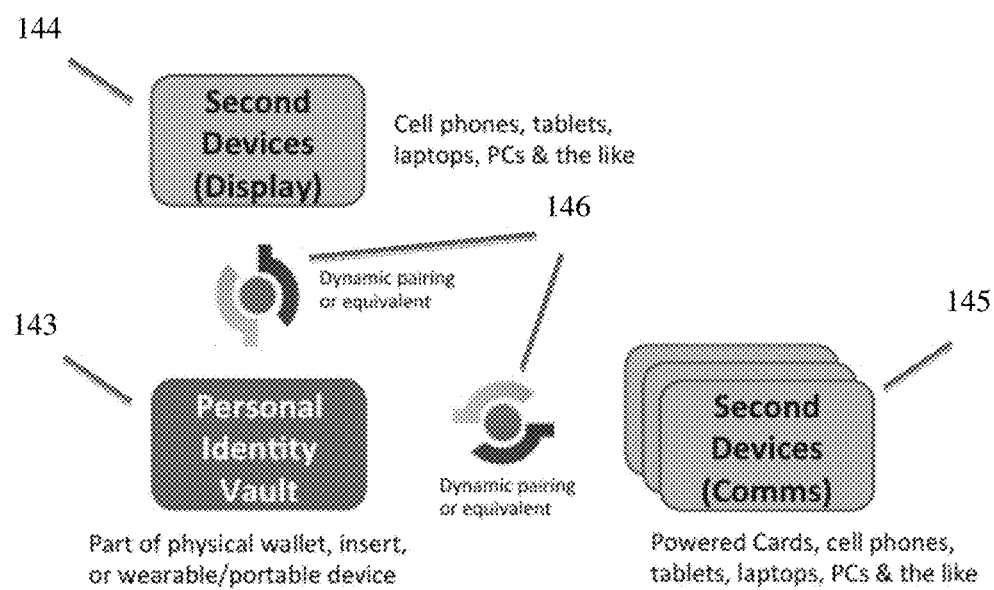
FIG. 11 describes an authentication process called dynamic pairing that can authenticate between a personal identity vault and a secondary device acting as a controller and display for the vault, and another second device acting as a conduit to support consumer transactions via communication paths not inherent on the personal identity vault.

As shown in FIG. 11, personal identity vaults 143 may communicate to multiple second devices 144 and 145 with NXT approved authentication such as dynamic pairing 146 or equivalent authentication methods. Some second devices 144 may act as a display for the personal ID vault, while other second devices 145 act as conduit to send private information over other protocols and methods not inherent to the vault.

Figure 12:
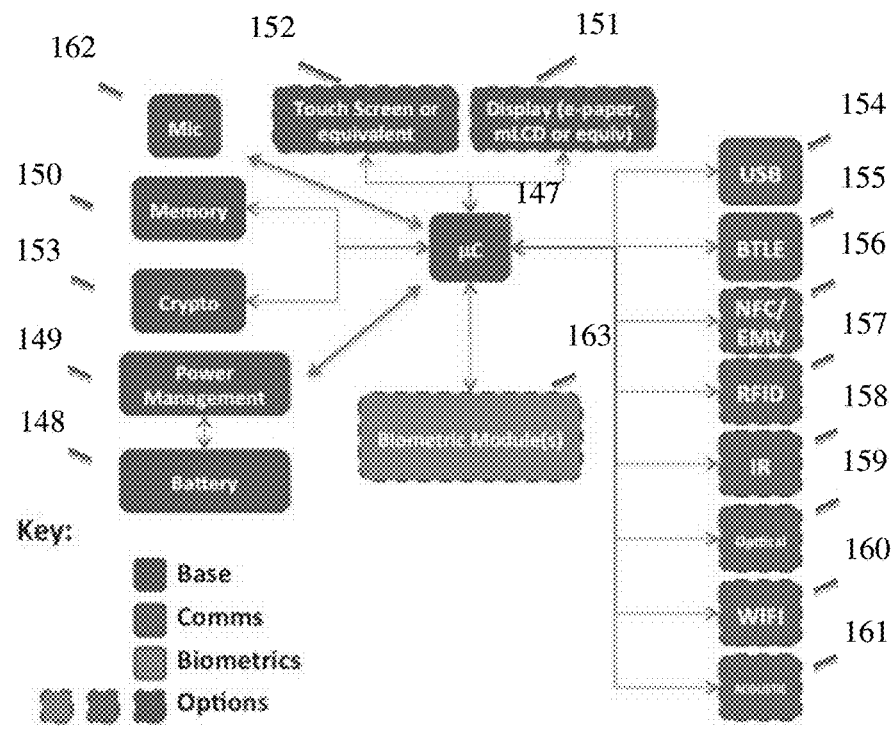
FIG. 12 is a block diagram of the personal identity vault that illustrates the major functional blocks of the invention.
Figure 13:
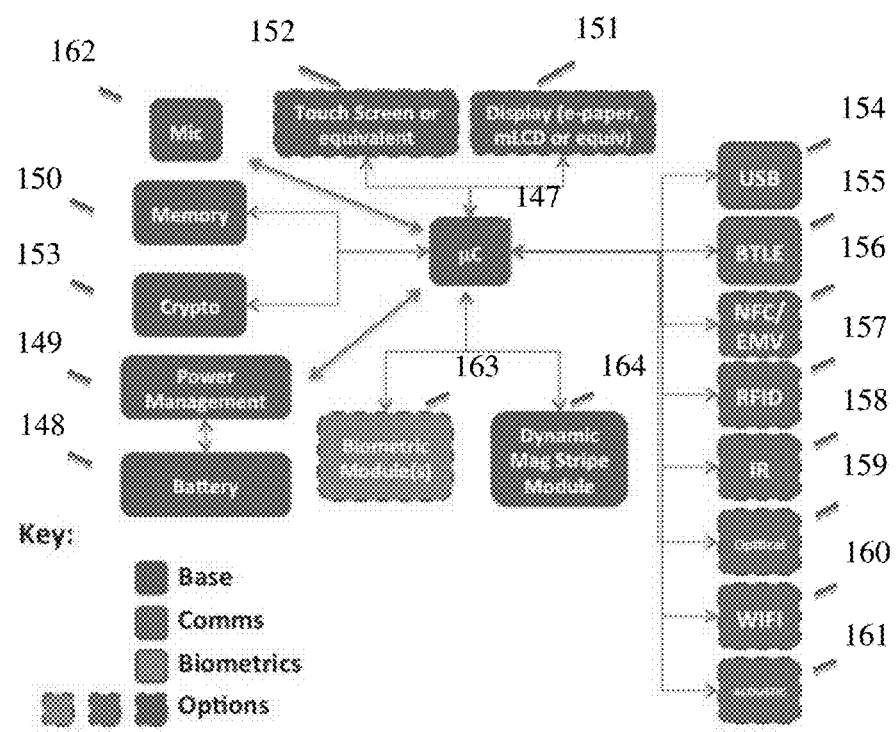
FIG. 13 is a block diagram of a powered card as a secondary device with major functional blocks of the invention including a dynamic magnetic stripe module.

The hardware for the private electronic vault and one embodiment of a second device hardware may be similar as shown in FIGS. 12 and 13, consisting of an ultra low-power microprocessor 147 powered by batteries or super-capacitors 148 managed by a battery monitor, input power condition, DC to DC converters, recharging circuits with optional inductive and/or RF wireless recharging circuits, all within a power management block 149. The microprocessor 147 acts as the microcontroller for all onboard peripherals including RAM and NAND memory 150, or optionally FRAM and/or NVRAM (shown as part of the memory block 150 in the diagram) in some configurations. For either of the two devices, the microprocessor 147 may interface with an optional low-power e-paper, memory LCD and/or color display 151. A transparent/semitransparent touch screen may be overlaid atop the display 152, in some configurations, and optionally wired directly to an analog comparator module within the microprocessor for ultimate low power performance while filtering and interpreting touch events, or replaced with physical buttons (not shown) outside of the display for user interface controls. The vault also contains a multi-factor voice recognition algorithm via voice collected by an onboard microphone that connects directly to dual stage amplifiers within the processor for filtering and amplifying the voice. Amplifiers within the processor further reduce power consumption and chip count/cost. Both devices may also communicate via contacts 123, USB 154 or optional wireless communication including BTLE (Bluetooth Low Energy) 155, NFC/EMV 156, RFID 157, infrared 158, optical 159, WiFi 160, acoustic 161, or custom low-power RF communication (not shown). In addition to multi-factor speaker and word recognition (voice recognition), which is inherent on a private electronic wallet device, other biometrics may be optionally added including gesture, finger, face, 3D face, IRIS, eye, eye vein, eye tracking, DNA, vein, palm, heartbeat, sweat, vibrometry, and/or scent by adding those sensors to the interface of the microprocessor. Microprocessors on each device may also integrate with a tamper-proof authentication crypto chip 153, which houses identifiers, high quality random number and key generators internally such that no keys or identifiers are ever released by the authentication chip. Only random numbers are ever passed over encrypted communicated between the first and second devices.

The second device (or in those embodiments having a plurality of second devices) may provide a conduit to transfer the private information over some specific payment or transfer methods that exist on the second device. For instance, some commercial devices may support various communication methods such as WiFi or NFC, negating the need for the next generation payment and personal identity wallet to support these methods directly on its device. Instead, the private electronic vault device (the first device) may simply communicate to the second device that then acts as a conduit to adhere to any communication standards from authorities that dictate the transfer of private information, such as HIPPA or financial authorities.

Figure 14:
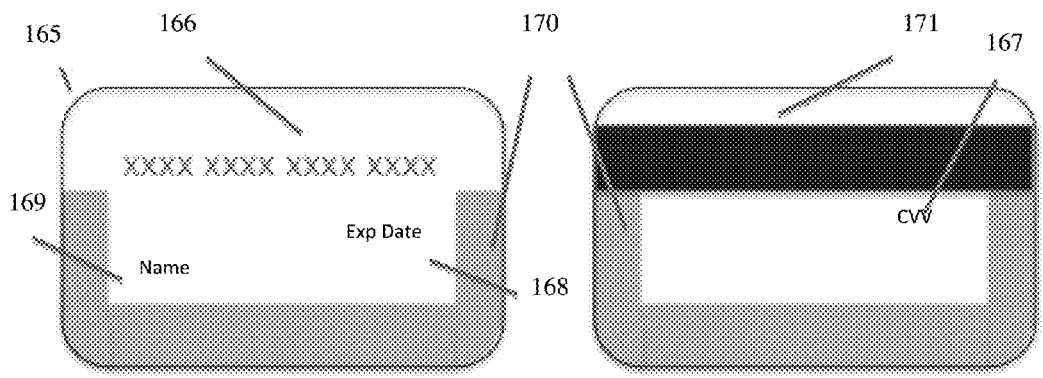
FIG. 14 describes areas where pinch conductive material can be applied to both sides of a powered card to achieve pinch power, a method to turn on a powered card by completing a circuit as a user naturally holds the card.

The second device(s) may comprise any mobile, portable, or wearable device such as cell phones, tablets and the like, or even fixed computing devices such as PCs. In one embodiment, as shown in FIG. 13, the second device can contain similar components (in function), but not necessarily the exact same chip as that with the primary electronic vault, such as a crypto chip 153, ultra low-power processor 147, flash memory, SDRAM, FRAM or NVRAM (collectively part of the memory block of the diagram), display 151 and touch screen 152, battery 148 and power management 149, crypto 153, microphone 162, biometric modules 162 and communications methods such as USB 154, BTLE 155, NFC/EMV 156, RFID 157, infrared 158, optical 159, WiFi 160, acoustic 161, or custom low-power RF communication (not shown). These second devices powered cards 165 may also include a dynamic magnetic stripe module 164 to interface with mag stripe card readers using a powered card. For secondary powered cards specifically, each of the components may be wired thinner versions of these chips, wafer or die formats 0.5 mm or thinner, in order to conform to ISO standards for payment cards of approximately 0.79 mm or thinner). Displays on these cards may also be thinner and can include other ultra thin displays that shows the payment account number 166, in whole or in part, and other information such as CVV 167, name 169 and expiration date 168 as shown in FIG. 14.

Power Management: Battery and/or super-capacitors (collectively shown as block 148) are continuously monitored by power management 149 at a predetermined time interval to activate a "low-battery" indicator (LED or equivalent shown as part of the Power Management block 149) when power is measured to be below a specific threshold. A rechargeable circuit (shown as part of block 149) allows power to be recharged when connected to a 5 VDC USB device, or alternatively to be recharged via optional wireless inductive or RF charging methods, or other power harvesting methods such as solar/light, RF, piezoelectric/movement and thermal (each shown as part of the power management block 149 on the block diagram).

According to this invention, a second device, such as a dynamically programmable card, can be charged wirelessly by the private electronic vault (i.e., the first device) while the dynamically programmable card is near the private vault device, such as within a wallet. An optional wireless inductive ultra thin coil (shown as part of block 149) associated circuitry enables the primary device to communicate and charge the second device(s) using inductive charging conforming to the QI interface standard for inductive electrical power transfer. Alternatively, power may be transferred from the first or primary device to the secondary device via RF energy, such as BTLE, by adding an optional amplifier (shown as part of block 149) that boosts the RF energy on the primary device, and an optional power-harvesting chip (shown as part of block 149) on the Bluetooth transceiver on the secondary device. Under this scenario, a powered card sitting within a wallet can be charged by the electronic vault by sending information to the electronic vault when charging should take place. Thus, with this scheme, the battery within the powered card can be kept charged just as long as the larger battery for the private electronic vault (the first or primary device) within the wallet has charge, thereby extending the overall operation of the powered card (second device).

Power states are closely controlled within the microcontroller to achieve ultra lower power consumption and longest battery-life between charges. To take advantage of the infrequent use of a wallet in real-life, power may be totally turned off and turned back on using an innovative switch to FET (field effect transistor), which ensures no power is consumed when the device is powered off. Alternatively, to provide low power performance of the wallet while also automating the on/off mechanism, a magnetic switch 110 may be connected to a FET such that the electronic wallet automatically turns on as the wallet is opened, and off as the wallet is closed. The advantage of these two switch methods is that no power is consumed while the wallet is powered completely off, which increases the time between charging the battery.

When the private electronic vault is powered on, the microprocessor can be held at various "power states" that turn off the core processor and all peripherals except the a GPIO pin that can be used to wake up from "deep sleep". Other power states include keeping the core off while interfaces to peripherals on. This enables DMA (direct memory access) transfers from one peripheral, such as memory, to another peripheral, such as the display, with minimum involvement (and power) by the processor. This allows the microprocessor to be kept at its lowest states and "wake-up" to other states only when the core processor is needed. This schema achieves lower power performance by "ping-ponging" between power states only as resources on the ultra low power microprocessor are needed. For instance, power can be conserved by waking up the microprocessor from its lowest power state (deep sleep) while it scans the touch screen at a very low frequency, increase to another state to capture the touch gesture by increasing frequency of scanning of the buttons, and returning to the lower power state after the touch has been completed. Likewise, interpreting the touch via table rather than requiring a processor to process the touch results can conserve power. Furthermore, power can be saved by transferring data via DMA to a display or RF peripheral that can then be awakened and display, process, or transmit that data. Thus, under this method, an event, such as a touch event, can be interpreted and data sent to a display and other peripherals while conserving power by ping-ponging the microprocessor between states.

Another unique power reduction feature is to power peripherals of the microcontroller directly from GPIO (general purpose input output) pins such that any peripheral can be powered on or off directly by the microprocessor. With this schema, no current is consumed by any peripheral unless the microprocessor "wakes up" that peripheral by turning on the appropriate GPIO pin. Powering the peripherals directly by the microprocessor in this manner not only reduces needless power consumed while a peripheral is not used (e.g. in a quiescent state), but also reduces chip count by eliminating DC supplies.

To further reduce power, the secondary device can be awakened via a membrane switch, or optionally by an RF wake-up circuit or "pinch power" methods. The RF wake-up circuit consists of a resonantly tuned antenna with a receiver that then harvests the power from that signal to wake-up the rest of the circuit. Similar to semi-passive RFID, this RF wake-up method utilizes the frequency and power of the transmitter to create a resonant signal whose power can be harvested to wake-up the microprocessor. This method can be applied to Bluetooth Low Energy (BTLE), NFC, RFID or virtually any RF circuit.

Pinch Power: Another method to turn on and off powered cards is pinch power. As shown in FIG. 14, a card may remain in an "off state" until a user "pinches" both sides of the card, completing a circuit by shorting electrical conductive material 136 placed on both sides of the card. Most prior art for conserving energy on a powered card requires the user to actively take some action to activate the powered card, such as push a button in a certain area of the card or flip the card. An advantage of this pinch power method is that it utilizes no such user activity. The card simply works as the user naturally picks up the card.

Figure 15:
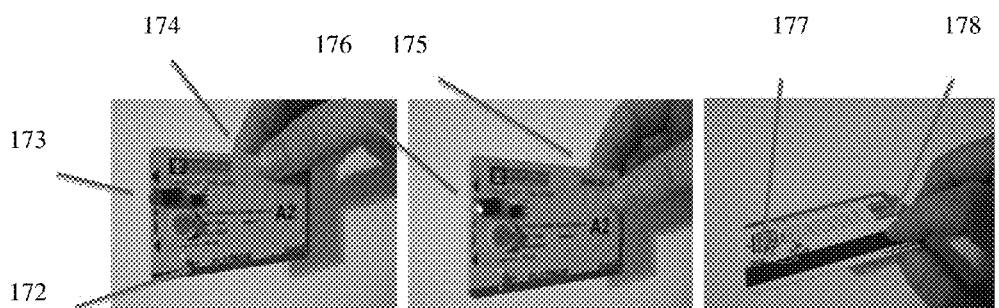
FIG. 15 illustrates a pinch power prototype with copper material on the designated areas of both sides of a card and an LED that lights to show when the card is pick up, the circuit activates the powered card.
Figure 16:
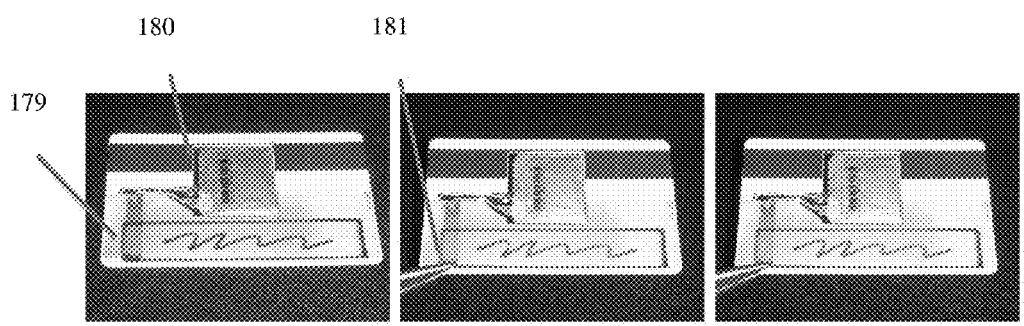
FIG. 16 illustrates a pinch power prototype with transparent conductive material on designated areas of both sides of a card.

Pinch power allows the device to be powered on by latching the power and can be turned off by the processor 147 when the card is done being used or a timeout occurs. A pinch power device is constructed by applying two planes of conductive material 170 to specific regions on opposite sides of the card as shown in FIG. 14. These regions are selected to avoid specific areas of the card, such as where a bar code 177 might be located or the magnetic strip 171 in FIGS. 14 and 178 in FIG. 15. When grasping a card in non-conductive areas 174 as shown by the prototype in FIG. 15, nothing happens as indicated by the non-lit LED 173 in this prototype. As a user grasps both sides of the card in the conductive regions of the card 175 (as one would naturally do when attempting to use the card), a conductive path is completed by the user's fingers 175 and activates the Pinch Power latching circuit (not shown but described below), which in turn lights the LED 176 (for purposes of this prototype). Conductive regions 170 can be achieved either by exposing a conductive material 172 that connects to the inlay or using a transparent/semi-transparent conductive spray 179 as part of the lamination of the card that then touches electrical "posts" or conductive areas that are exposed during the manufacturing process (exposed copper or equivalent material that connects to the inlay much like smart cards such as contact EMV). The material is then wired to the circuit and battery 180. As with exposed copper, a circuit is completed when both sides of the card are touched with a conductive material, such as fingers or for the purposes of this prototype, pliers 181. Conductive translucent coatings are available for use on the typical card PVC material. This method reduces power consumption of powered cards, while simplifying the user experience and reducing the chance of a powered card turning on accidently within a pocket or wallet.

When power is first applied to the circuit, the switched output is not active. When the user completes the circuit by pinching in the conductive regions on both sides of the card, the output becomes active and is latched. If nothing touches the conductive regions on both sides of the card, the circuit will continue to output power until a timer is completed by the microprocessor, or unless both of the conductive planes are shorted again (e.g. the user pinches the powered card on conductive regions on both sides of the card). Upon initial power-up of the microprocessor, the microprocessor control pin is set to an input state. This allows for detection of additional touches of the conductive planes. When the card has finished its task, or a timeout condition occurs, the microprocessor can set the microprocessor control pin to an output, and an active low state will reset the latching circuit to a powered down state.

One embodiment of this latching circuit involves using an N-channel enhancement mode vertical DMOS FET. The enhancement mode feature means that if the gate voltage is zero (no touching) then the FET switch is OFF. When a person picks up a pinch power enabled card, he/she will naturally touch both sides of the card where the conductive material is around the edges of the card. Thus, the skin of the person closes the gate (short) of this FET, thereby applying a voltage to the gate to turn on the FET. Once turned on, a timer on a microprocessor (or equivalent) can be programmed to turn off the powered card based on a set interval (a user programmable interval in one embodiment). When the gate reaches the battery voltage, the current flow will cease.

This "pinch power" approach solves two key problems with powered cards:
How to turn them on and off without cumbersome switches.
How to keep them from turning on when placed in areas that could activate a "switch" mechanism, such as a wallet, and thus needlessly drain the battery.

Figure 17:
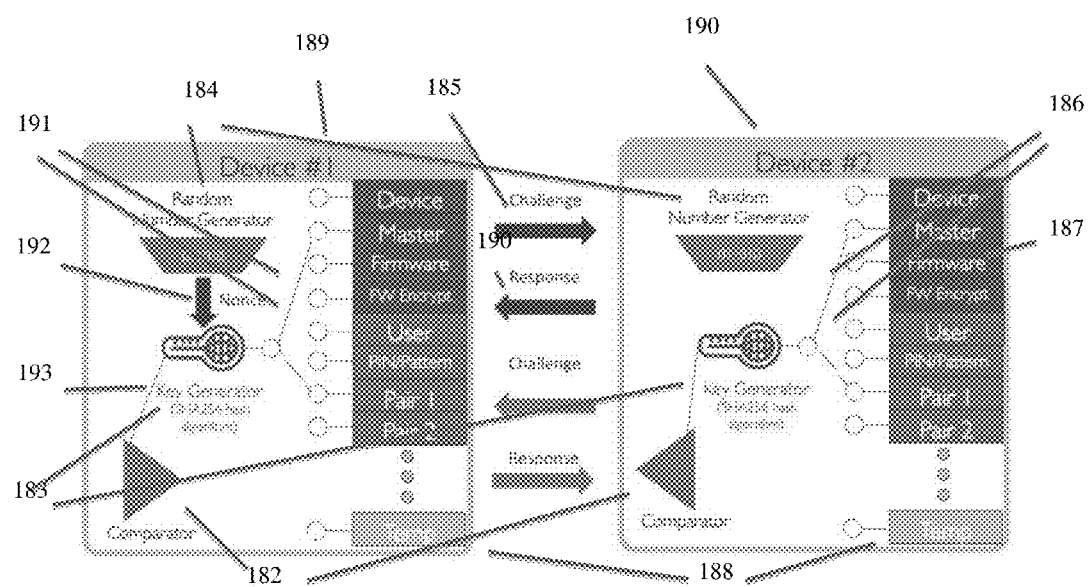
FIG. 17 details how two devices authenticate one another via dynamic pairing.

Dual Device Authentication: The second device 190 must authenticate with the private electronic vault (first device 189) before any information is passed or transaction performed. As shown in FIG. 17, two devices are dynamically paired when a random number 185 output from a high-quality random number generator 184 from within one device is input to the crypto chip 153 of the second device, and a SHA256 hash is generated by a key generator 183 between the random number 185 and some combination of the various identifiers 186. The generated pseudorandom number response 190 is then sent back to the first device, where it is compared by an internal comparator 182 with a SHA256 hash 193 of the same pseudorandom number generated 192 as that was challenged 185 and the same internal identifiers 191, all within the crypto chip 153 onboard the first device. If the two numbers match, the devices are authenticated.

Likewise, a one-time-use encryption key may be generated between devices in the same manner as authentication, in order to encrypt and store credit card numbers, names, and other private information on the private electronic vault. The temporary key may be stored in a temporary memory slot 188 within the crypto chip 153 The vault then sends encrypted data to the second device via a wireless communication link, where the encrypted data is decrypted via its internal one-time-use encryption key and then sent by the second device via the appropriate transaction method. For instance, if the transaction method is a common point of sale (POS) that utilizes magnetic stripe techniques, the second device may be a powered card with a reprogrammable dynamic magnetic stripe 163. Thus, the second device acts as a conduit to support virtually any method of payment or communications.

Dynamic codes are generated from combination of one or more unique identifiers and/or keys 187 that are specific to factors including but not limited to users, manufacturers, devices, accounts, locations and/or sessions or transactions. Identifiers that may be used within the dynamic pairing method include biometrics, proximity sensors, user "secrets" (Passwords/PINs/etc.), manufacturer ID, wallet ID, master encryption key, user customizable card names, card type, device serial number, electrical noise ID, CRC, MAC address, CVV, charge limits and time duration. A high-quality random number generator 184, Identifiers 187, embedded key generator 183, and comparator 182 are all safely hidden within the tamper-proof crypto chip 153 at all times. Even the proprietary dynamic pairing code algorithm used to generate the dynamic pairing codes may be stored in a tamper-proof crypto chip 153 as well, so that no information is ever available to be hacked.

The algorithm that generates the dynamic pairing code uses different combinations of these identifiers during different data sequences or at different time instances in combination with a high quality random number generator 184 local on the same protected crypto chip 153 so that identifiers 187 saved on the device are never externally accessible. The combination of which identifiers are used and when they are used is based upon a proprietary NXT-ID (assignee of the present invention) algorithm. Thus, only the generated random number and its response are ever shared between the first and second devices.

Any second device, such as the dynamic card or even a cell phone, may be authenticated via dynamic pairing or equivalent method that sends a high quality random number 185 as a challenge to the other device, and compares the response 190 with its internally generated result. For second devices that are commercially available, such as cell phones, authentication codes may be generated by a SHA256 generator within software, or for more security for cell phone and other remote applications, the app can be in the middle of the 2 devices, where the app communicates from one device through the app to another device to ensure security at all times, even in demanding remote applications Challenge/response methods of authentication such as dynamic pairing have a distinct advantage of performing multi-factor authentication by passing only pseudorandom numbers, without revealing any identifiers or keys. Furthermore, having the pseudorandom number generator, comparator and the key generator within the same tamperproof device that also holds the identifiers ensures all secrets are kept secure during authentication and encryption key generation.

Figure 18:
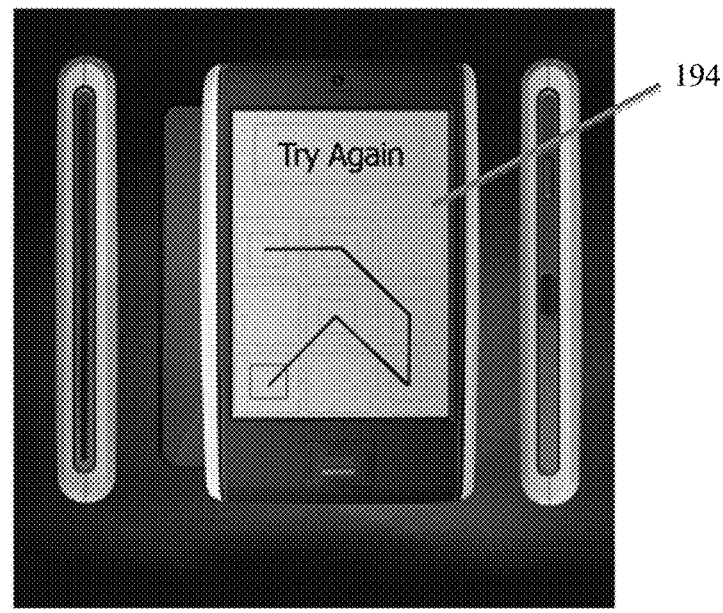
FIG. 18 describes a user interface (UI) concept for a user to access a private electronic vault by drawing a user-configured pattern.
Figure 19:
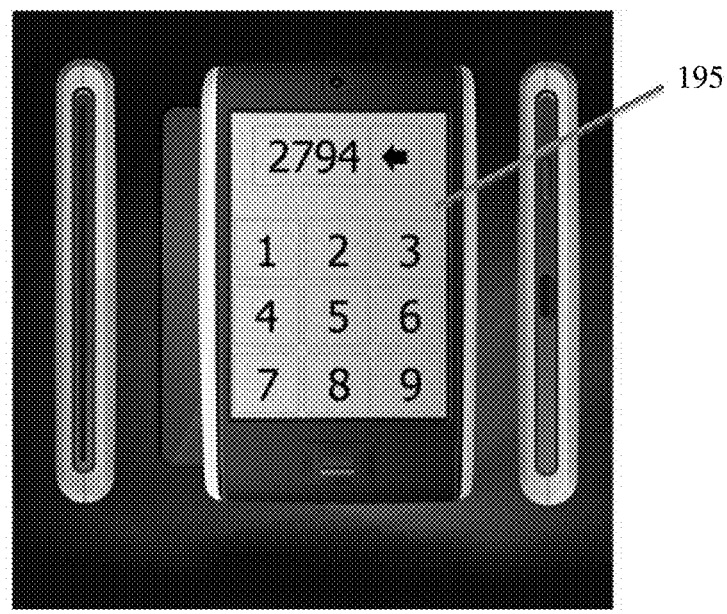
FIG. 19 describes a user interface (UI) concept for a user to access a private electronic vault by typing a user-configured PIN.

User Authentication: Users may access the private electronic vault by responding correctly to the authentication question from the vault. Questions could be preconfigured by the user or random. A user may be asked to speak a certain word via a microphone 162, or provide a pattern 194 as shown in FIG. 18, password or pattern 195 as shown in FIG. 19.

Voice is a unique biometric in that a user may speak a typed word and a VoiceMatch™ algorithm that will recognize both the speaker and the word. In some embodiments, the user may simply give a spoken word correlated with specific private information, like a payment account or medical record. The private electronic vault will perform multi-factor authentication on this word by recognizing the speaker and the word itself. The word is then recognized as associated with the private information, and that information can then be sent to the second device. Additional security protection may be put in place, as a user desires, to require another authentication to display private data on the device.

Interfaces: The standard communication interface to the devices is BTLE (or for second devices, just simple Bluetooth), but the devices can also support other optional interfaces such as USB, or wireless interfaces such as NFC, RFID, infrared, optical acoustic, or WiFi. In some embodiments, these interfaces may be used by applications on the authenticated second device to communicate and control the private electronic wallet to add, delete, modify, manage and receive private information for some transaction. Private information that can be downloaded to the private electronic wallet may consist of payment, loyalty, identity, health, medical, or just about any information found within a typical wallet. Non-private information such as advertisements, coupons, shopping lists and the like may also be transferred to the private electronic wallet. In other embodiments, information may be scanned directly into the private electronic vault from a Square reader (a well known magnetic strip reader for mobile platforms), USB or Bluetooth standard magnetic strip reader for added security.

One advantage to this architecture of the private electronic vault is its standalone feature where all interfaces are controlled via end-to-end authentication and encryption so that no hacking can be achieved even when connected to other, more vulnerable devices such as cell phones and PCs (i.e., the second device of the system of the invention).

Validation process to enter data into wallet

One embodiment of the invention supports two validations processes

1. Name variation embedded in the private electronic vault

2. Validation process of payment cards prior to scanning.

When a user signs up for first time, she/he enters a last name and up to three variables for first, middle and nicknames. These names are then configured into specific write-only areas within the crypto chip of the electronic vault. As users load data from magnetic stripe cards, the private electronic vault parses the names swiped by a magnetic stripe reader and matches those names internal to its memory vault. If the names match, the card information is accepted and encrypted using a self generated encryption key that is also saved into internal secure memory. If additional names are needed, users may contact NXT-ID to allow more than three variations in an authorized name.

To further avoid card cloning, a user may submit all money-related cards to an approval process upon initial use, where the identity of the individual and the card are validated, and store the bio key in a personal vault remotely. Once approved, the authentication key prevents other users from using the private electronic vault to program any new secondary devices. Only private information, such as payment accounts, approved by the approval process can be used by the electronic vault and dynamic card. Note, library, club membership cards and the like need not be approved if not desired by the user. Anyone trying to make a card from another individual's private electronic vault would have to follow the same authentication process and therefore would be caught. When authentication is attempted between the devices and the user and the authentication key does not match, authorities can be notified to pursue the attempted clone. Combining this with other methods such as timeouts and/or number or type of products to be purchased further reduces theft and fraud.

Private Information Selection: Once private information is scanned or entered via the validation process, users may correlate the data to user-selected word(s) that act as aliases for the protected private information. These word(s) may be spoken and/or typed for security purposes. Alternatively, a user may also enter other biometrics 163 and user secrets as options to the private identity and payment vault to add further security to the user authentication process.

For instance, a user may wish to correlate "green gas card #3" to represent his or her Chase Visa credit card that he or she uses for payments for gasoline. When a user then wants this payment account, he or she would simply press the on button to activate the private electronic wallet and speak the previously recorded word representing the user's associated private information (in this instance, his or her payment account associated with his or her Chase Visa credit card). The word that the user speaks is then analyzed and compared to the previous word using a voice recognition algorithm internal to the private electronic vault. This algorithm identifies both the speaker and the word, and then programs the second (or payment) device with the Chase Visa credit card information and/or displays the information to a display on the local device as previously configured by the user.

Figure 20:
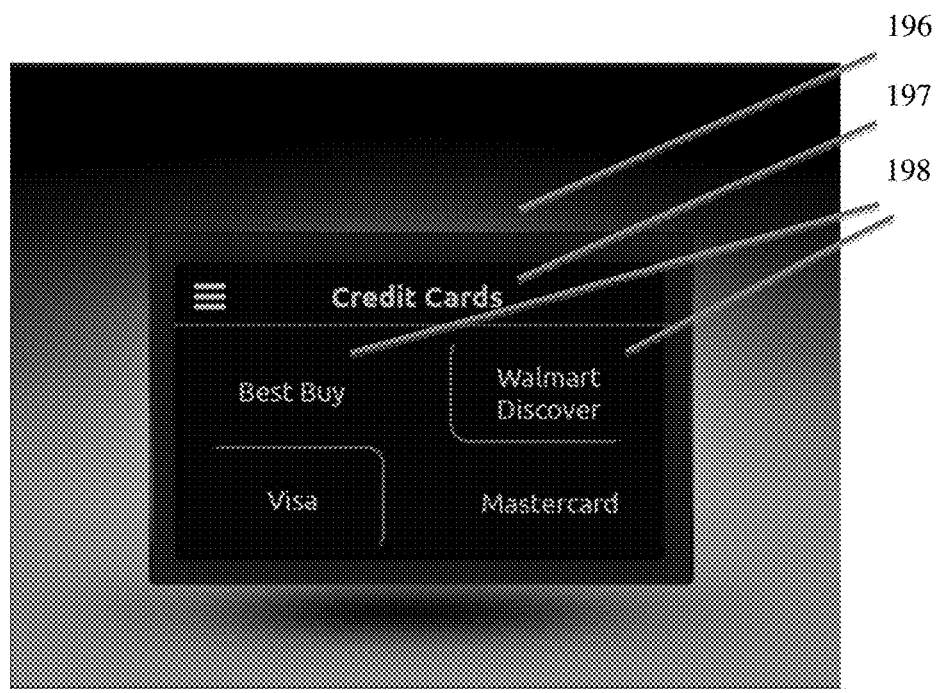
FIG. 20 describes the user interface (UI) for the private electronic vault where users may select from user-configured aliases.

Alternatively, a user may slide through each of the aliased word(s) 198 via a touch display and select the alias 198 that the user wishes to send to the second device. FIG. 20 describes the user interface (UI) 196 for the private electronic vault where users may select from user-configured aliases 198 that associate to some personal information within some user-configured categories 197 that has been stored to the vault. This user interface enables users to slide through a number of aliases 198 using a sliding gesture and/or buttons. The number of aliases (associated to captured personal information) is only limited by the memory configured on the device (defaults to 100 cards, but can support higher numbers with a larger memory chip).

Figure 21:
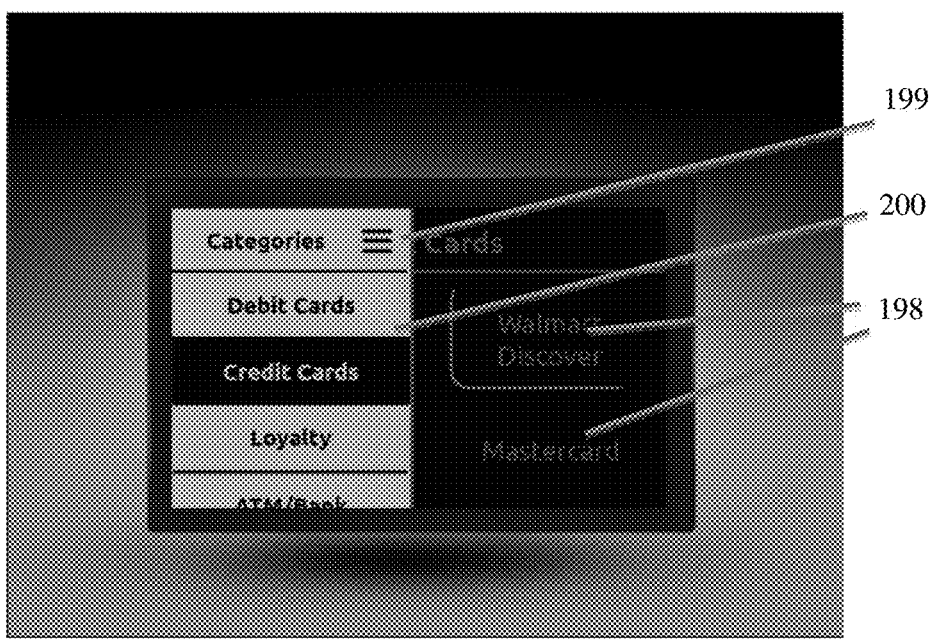
FIG. 21 describes the user interface (UI) for scrolling through user-definable categories on the private electronic vault.

As described in FIG. 21, the user interface (UI) may scroll through user-definable categories 200 on the private electronic vault where users may select a category of aliases 199. This menu is activated by pressing the "menu" button 199 (whose icon is obvious to those that have used current cell phone app technology), or by sliding left or right to open or close the menu.

This app may also be applied to other second devices that are authenticated. For instance, in the case of supporting a payment with a point of sale (PoS) system supporting magnetic stripe, a user may select the alias 198 by sliding through categories 199, selecting the appropriate category 200 the word(s) associated with the alias 198, or sliding through all categories 200 and aliases 198 on the vault; the vault then programs an authenticated second device, which in turn programs its internal programmable magnetic stripe. In another embodiment, the alias could be selected by speaking into an application on an authenticated second device such as a cell phone, which then in turn commands the private electronic vault to select the appropriate alias and programs the authenticated second device with the programmable magnetic strip.

Figure 22:
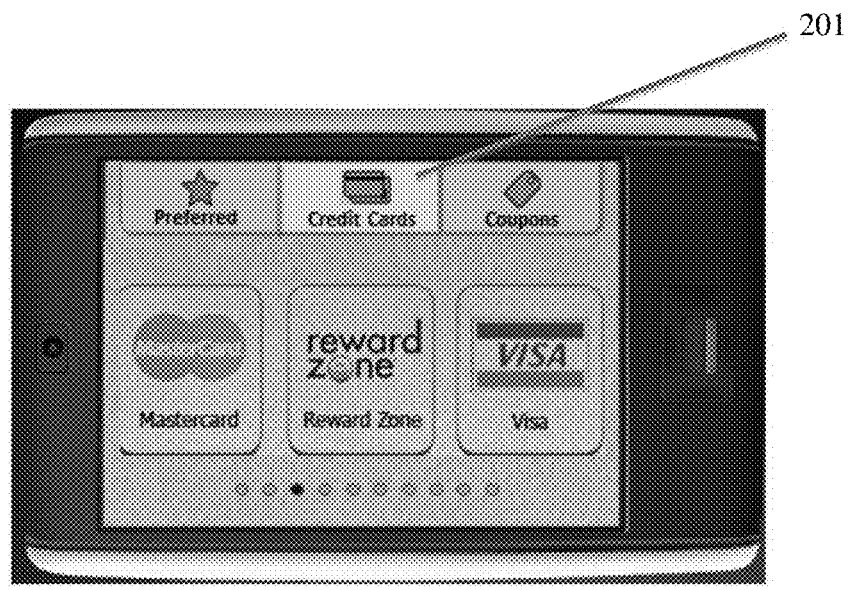
FIG. 22 describes another user interface (UI) concept for a user to access categories of aliases to personal information.
Figure 23:
FIG. 23 describes another user interface (UI) concept for a user to access preferred aliases.
Figure 24:
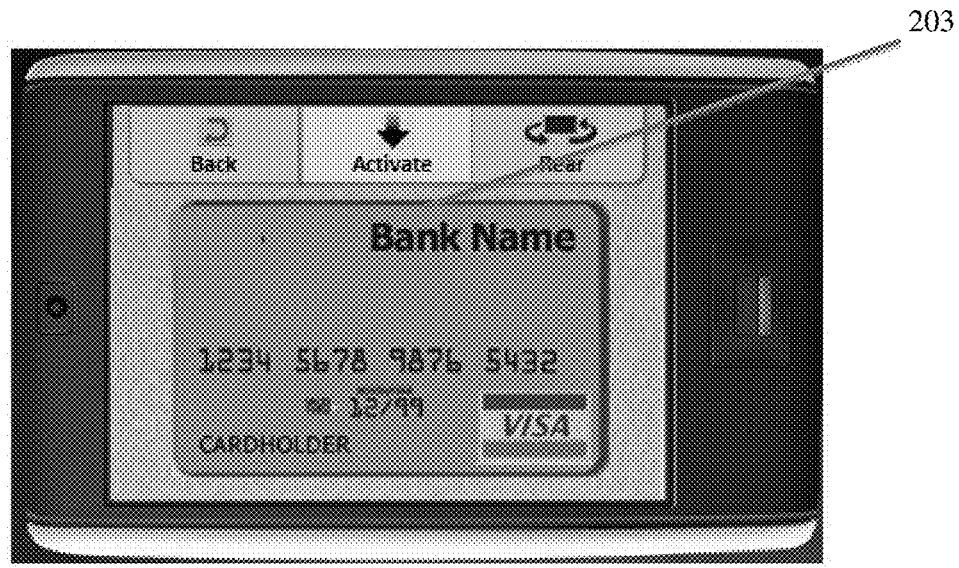
FIG. 24 describes a user interface (UI) concept for a user to view details of private information such as a payment card.
Figure 25:
FIG. 25 describes another user interface (UI) concept for a user to view details of private information such as a payment card.

Another user interface (UI) concept for a user to access categories 201 of aliases to personal information is shown in FIG. 22, while FIG. 23 describes another concept for a user to access preferred 202 aliases. FIGS. 24 and 25 illustrate a user interface (UI) concept for a user to view details 203 and 204 of private information such as a payment card.

Figure 26:
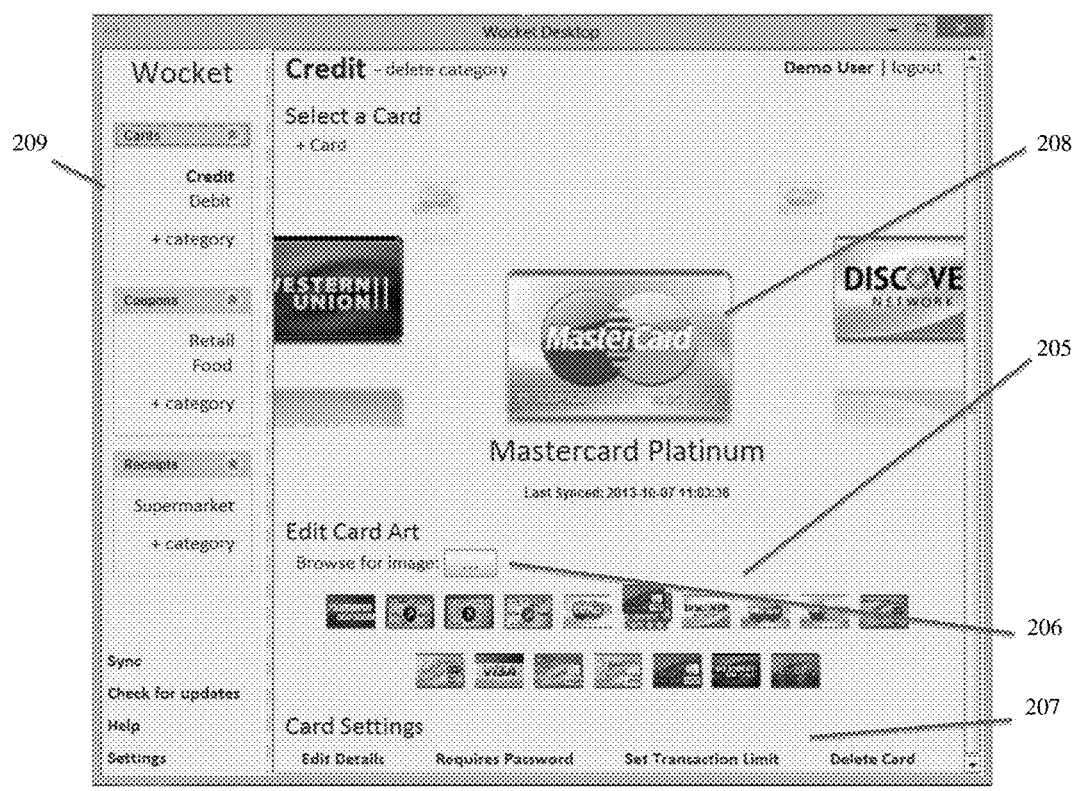

As shown in FIG. 26, personal information and cards securely hidden within a private electronic wallet may be managed from an app on a authenticated second device, such as mobile and fixed devices like cell phones, tablets, laptops, PCs and the like. Under this user interface (UI) personal information, such as payment cards, may be represented by logos, card pics, or other art 205 that a user may select from a browser 206. Settings 207 for each card may include alias names, transaction limits, etc. Once a card is scanned or entered into the private electronic vault, it appears as its correlated alias 208 (whatever alias name, logo, and settings given that personal information by the user). Categories 209 may also be programmed and loaded onto the private electronic wallet from an authenticated app on a second device. From this management UI, a user may search various categories such as cards, coupons, receipts, etc.

Thus, according to one embodiment of this invention, private information is totally under the owner's control on the private electronic vault. The user may choose to display the private information on the private electronic vault itself, or send the private information from the vault itself using supported payment and/or communication methods optionally installed on the vault such as BTLE, NFC, dynamic magnetic stripe, EMV, QR and bar codes, infrared, acoustic, or WiFi. In other embodiments, the user has the added flexibility to interface to other authenticated second devices that then act as a conduit for the private information to be used to interface with other payment or communication methods. Once a transaction is completed, private information on the second device is zeroized by iteratively writing random ones and zeros over memory to make the second device "dumb" again and ensure all private information is destroyed. In this way, all private information is preserved 100% of the time as the second devices act as controls and/or conduits for the private information to support various communication and payment methods.

Security: One advantage of the approach of the various presented embodiments is security. Users can program the devices with any combination of the following security features:

User to Vault: Regardless if an authenticated second device is used or not, all users must be authenticated to the private electronic vault (the first device) using one of the following methods:
    a. Biometrics 163 of FIG. 12: A biometric, such as voice, entered by the user matches that entered during setup (Note: Biometrics can include voice, gesture, finger, face, 3D face, IRIS, eye, eye vein, eye tracking, DNA, vein, palm, heartbeat, sweat, vibrometry, and/or scent by simply adding those sensors to the interface of the microprocessor).
    b. PIN or Password: A PIN or password entered by the user matches that entered during setup.
    c. Pattern: A pattern drawn on the screen matches that entered during setup.
    d. Signature: The signature entered by the user matches that which was written on the rear and/or display of the device(s).
  Private Data to Vault (i.e., the first device): Name variation embedded on the private electronic vault must match that scanned by any private information being input from certain types of cards such as payment, medical, and identity cards.
  Card to a Card Company: The card is approved as valid by a financial or other institution providing the card.
  Two paired devices: The two paired devices must be stolen under certain embodiments, not just the wallet.
    a. Pairing: The second device(s) are dynamically paired to a specific private electronic vault.
    b. Proximity: The second device(s) in close proximity with a paired private electronic vault.
    c. Name etching: A name may be permanently etched onto the private electronic vault (also referred to as the first device) to match other forms of identification of the user.
    d. CVV, Names, Numbers and/or Expiration Dates: CVV, names, numbers and/or expiration dates may be displayed on the device(s).
    e. Charge limits: The transaction does not exceed the amount limit set by the owner of the private information.
    f. Time duration: The time duration for a transaction or account does not exceed that set by the owner of the private information.
    h. Dynamic Authentication and Encryption keys: One-time use authentication and encryption keys that are generated dynamically based on the time of day and/or sequence, and/or a combination of the identifiers.

In some embodiments, the private electronic vault (i.e., the first device) and the second device must both be present for any transaction to take place. Pairing the device(s) reduces theft and fraud by requiring both devices to be present and authenticated with one another prior to any transaction that accesses private information. This significantly limits the ability of thieves to clone cards, for instance, since both devices must be present to program the first device (electronic vault), and they are further protected with a key derived from the combination of methods described.

The user may additionally set further limitations before the transaction takes place. Users can select any or a combination of methods including biometrics, proximity sensors, time out periods, maximum dollar amount, number of transactions, type of transactions, or user selected products that are allowed to be purchased. If these limitations are exceeded, the devices immediately detect the anomaly and theft or fraud can be prevented, and authorities can be notified.

Limitations at the point of sale reduce the impact of fraud while keeping within the bounds of current transaction and payment technologies. These methods of security are advantageous to "end-to-end" solutions, since they apply limitations to access private information prior to any transaction and under full control by the user. Enabling the user to set limitations for use of the device(s) is also advantageous, since it occurs prior to any release of private information or point of sale, and the variability of settings will act as a further deterrent to thieves and fraud abusers. In addition, under this invention, the merchant need not be involved at all. Security is maintained without impact to the merchant in any way.

The methods of the present invention can also be extended to other mobile devices acting as the private electronic wallet. These methods may also be extended such that a mobile device authenticates directly to a second device, such as a dynamic magnetic stripe card. However, a severed configuration is advantageous, given it significantly reduces the vulnerabilities that still plague the mobile wireless device industry by providing a standalone, separate device that is virtually hack proof.

Integration with $3^{rd}$ Party Mobile Applications: The private electronic wallet can be used standalone or tethered to mobile or fixed devices such as a cell phone or PC and driven by third party apps and user interfaces on those devices. Security is maintained at all times by use of dynamic pairing or equivalent authentication and encryption between the private electronic vault and any of these second devices such as PCs, mobile devices and/or programmable dynamic stripe card. Basic configurations of the private electronic vault support BTLE to configure and validate the user. Other configurations include USB and wireless configurations such as NFC (Near Field Communications), RFID, WiFi, 3G/4G/LTE and Bluetooth, although each of these configurations has separate wireless security profiles.

Differences with other implementations of a digital wallet: The unique features of the present invention and its described first and second devices that separate the invention from all other prior art implementations include:

- A separate solution dedicated to the purpose of an electronic wallet, versus cell phones and other mobile devices that are multi-purpose.
- Two separate devices that must be "dynamically paired" to each other.
- Sufficiently small to support a number of different configurations, including:
  - Part of the physical wallet or standalone wallet insert
  - Money clip
  - Key chain accessory
  - Watch
  - Dongle
  - Cell Phone accessory
  - or any other device typically carried by an individual.
- Support the most common forms of payment today:
  - Magnetic Stripe
  - NFC
  - EMV
  - QR Codes
  - RFID
  - In other embodiments, infrared, acoustic, Bluetooth Low Energy (BTLE), WiFi, 3G/4G/LTE and cloud based payment forms are also supported.
- Replication of all cards and other information frequently found within a typical physical wallet, not just payment cards, including:
  - Payment cards
    - Credit
    - Debit
    - ATM
    - Gift
    - Cash
    - Calling
  - Loyalty cards
    - Shopping (Restaurants, Retail, etc.)
    - Frequent Flyer
    - Reward Cards
  - Club/Membership cards
    - Shopping (BJ's, Sam's Club, etc.)
    - Organizations/Affiliations (IEEE, etc.)
    - Social
    - Library
    - Hotel
    - Rental Car
    - Vacation
    - Roadside assistance
  - Identity
    - Licenses
    - Passports
    - Visas
    - Voter's Registration
    - Employee
    - Security
    - Passcards
    - Business Cards
  - Insurance
    - Auto
    - Health/Medical
    - Dental
    - House
    - Life
    - Travel
  - Medical Records Cards
    - Conditions
    - Medications
    - Hospitalization
  - Shopping lists
  - Discount
  - Coupons
  - Receipts
  - Tickets
- Enhanced Security features including:
  - User to Vault
  - Private Information to Vault
  - Card to Card Company
  - Two Separate Dynamically Paired devices as described herein
  - Pairing of external devices to the first device (the private electronic wallet)
  - Proximity
  - PIN or Password
  - Pattern
  - Signature
  - Name etching
  - CVV
  - Biometric enabled generated keys
  - Charge limits
  - Time duration
  - Dynamic authentication and encryption keys (based on dynamic combinations of information listed above).

Other Services: Unique services that may be integrated with this private electronic wallet technology include:
- Receipts (Pocket Accountant)
- Automatic Receipt Coding and Book Keeping
- Shopping List
- Shopping Assistant (Shopper and/or Retail Aisle Assistant
- Ads/Specials/Coupons
- Proximity Based Ads/Specials/Coupons
- RFID Ads/Specials/Coupons
- Proximity Cards
- Toll Attendant
- Money (Wires)
- Payment
- 24 hour Replacement Service
- Travel Service.

The following describes each of these services:

Receipts (Pocket Accountant): For transactions that utilize 2-way communications with servers, such as wireless/contactless methods such as NFC, RFID, WiFi and 3G/4G/LTE, transactions can be recorded directly to the first device (private electronic wallet) so that it acts as a "pocket accountant". Within this embodiment of this invention, information regarding the card such as balances can also be displayed with each soft-card.

Automatic Receipt Coding and Book Keeping: For transactions that utilize 2-way communications with servers, such as wireless/contactless methods such as NFC, RFID, WiFi and 3G/4G/LTE, transactions can be also automatically recorded, coded, sorted and output to third party programs such as excel and QuickBooks. Within this embodiment of this invention, information regarding the transactions of a card can be automatically output to business accounting tools.

Shopping List: Products can be typed, scanned or electronically obtained on a PC or mobile device, and downloaded to the Wocket™ to be used at a retail location.

Shopping Assistant (Wocket™ Shopper and/or Retail Aisle Assistant): This invention detects RFID enabled products as a shopper strolls down a retail aisle and notifies the shopper of any product that matches an item on a shopping list previously downloaded to the private electronic wallet or vault, commercially referred to as the Wocket™)

Ads/Specials/Coupons: This invention consists of advertisements, specials and coupons can be typed, scanned or electronically obtained on a PC, then managed on the PC, and downloaded to the private electronic wallet or vault to be used at a retail location. Coupons can then be retrieved on the private electronic wallet during shopping, and the bar code displayed for each coupon on the private electronic wallet e-paper, mLCD or low power color display. This display is advantageous since bar codes can be reliably scanned on this display (where they cannot on typical LCD displays on cell phones, for instance). These coupons can also be associated with optional shopping lists also managed and downloaded to the primary electronic vault.

Proximity Based Ads/Specials/Coupons: This embodiment consists of advertisements, specials and coupons that can be automatically offered to the shopper (user) based upon the store the user enters. The store location is detected by the private electronic vault via optional integrated GPS module, or via wireless integration with a user's cell phone.

RFID Ads/Specials/Coupons: This embodiment consists of advertisements, specials and coupons that can be automatically sent to the vault from the retail item itself as a shopper passes within range of the RFID of the specific retail item (or product). The shopper can then be notified of "specials" (coupons) that can be used with the product.

Proximity Cards: Cards can be automatically offered to the shopper (user) based upon the store the user enters. In this embodiment the store location is detected by the vault via optional integrated GPS module, or via wireless integration with a user's cell phone. The best cards are offered to the shopper based on calculating which card provides the best benefits for a given store or list of purchases.

Toll Attendant: The private electronic vault is also integrated with novel RFID that can be used as a passive mobile "Toll" payment method. The toll attendant service automatically interfaces with the same RFID technology of the E-ZPass Interagency Group (IAG), which comprises 25 agencies spread across 14 states.

Money (Wires): This service enables the private electronic wallet to transfer money to one another via a wallet to wallet validation process. Once validated, payments can take place between two parties with proper authentication of each of their respective Wockets.

Payment: The embodiment of this invention enables a private electronic wallet to accept payments. Consumers can pay for items via their typical payment method including magnetic stripe, NFC, contactless EMV, and QR Codes. The private electronic wallet can be configured to accept these forms of payment with connected or disconnected methods of validation (wireless payment validation and/or pre-authorization via housing each of the cards prior to transaction (so that they can be held securely until the validation process can be performed)).

24 hour Replacement Service: This embodiment provides an optional service to users to replace the private electronic wallet by calling the service number, validating the user's identity, and sending a new Wocket with all cards that have been placed by the user on the secure server Travel Service: This embodiment comprises an optional service that enables users to notify card companies of cards on a specific private electronic wallet of impending travel plans, to prevent the card company from calling the user to validate purchases as the user travels.

What is claimed is:

1. A method for storing a plurality of personal information items of a user and conducting a transaction for the user using a selected personal information item, the method comprising:
   storing the plurality of personal information items on an electronic wallet comprising a power supply;
   assigning an alias to the personal information, the alias not derived from nor based on the personal information;
   supplying recharging power to an electronic card through physical contact between first contacts on the power supply and second contacts on the electronic card when the card is disposed within a pocket of the electronic wallet;
   initiating the transaction with the electronic card, the electronic card controlled by a user pinching the electronic card by touching two regions of conductive material on opposing surfaces of a front and a back of the electronic card;
   authenticating the user to the first device;
   selecting the selected personal information item from among the plurality of personal information items using the alias from one of the electronic wallet or the electronic card, the alias further authenticating the user to one or both of the electronic wallet and the electronic card;
   transferring the selected personal information item from the electronic wallet to the electronic card in a format to support a desired transaction method; and
   conducting the transaction using the selected personal information item from the electronic card and according to the desired transaction method, wherein the electronic wallet and the electronic card remain in proximate relation to each other during the conducting of the transaction.

2. The method of claim 1, wherein after executing the step of authenticating the user, the user is able to load more personal information items to the electronic wallet or modify the plurality of personal information items on the electronic wallet.

3. The method of claim 1, wherein the selected personal information item on the electronic card is deleted or obliterated after the transaction is conducted, or after one use of the selected personal information item, or after a preconfigured number of uses of the selected personal information item, or after a predetermined time interval has elapsed from a more recent prior use of the electronic card.

4. The method of claim 1, wherein the step of selecting comprises the user selecting the personal information by touching the first device electronic wallet or the electronic card according to a predetermined touch pattern, or according to a predetermined touch region, or by speaking a predetermined voice command.

5. The method of claim 4, wherein the predetermined touch region comprises a display or a conductive material region.

6. The method of claim 1, wherein one or both of the electronic wallet and the electronic card comprises one or more of a low power e-paper, a liquid crystal display, and a color display.

7. The method of claim 1, wherein touch events on a touch region of at least one of the electronic wallet and the electronic card are interpreted via a comparator or a microprocessor to wake-up or control one or both of the first and second devices.

8. The method of claim 7, further comprising manually-activated input devices disposed outside of the touch region for controlling operation of one or both of the electronic wallet and the electronic card.

9. The method of claim 1, wherein one or both of the electronic wallet and the electronic card comprise one or more physical contacts on an external surface thereof, the method further comprising touching, by the user, one or more of the contacts to control operation of one or both of the electronic wallet and the electronic card.

10. The method of claim 1, wherein the step of authenticating further comprises determining a user's biometrics, further comprising physical traits and behavior determined by a sensor disposed on one or both of the electronic wallet and the electronic card.

11. The method of claim 10, wherein the biometrics comprise one or more of gesture, finger, face, three-dimensional face, iris, eye, eye vein, eye tracking, DNA, vein, palm, heartbeat, sweat, vibrometry, and scent.

12. The method of claim 1, wherein the transaction involves one or more of financial information, medical information and identity information.

13. The method of claim 1, wherein the electronic wallet further comprises a microprocessor performing functions associated with the electronic wallet, the microprocessor capable of assuming any one of a plurality of sleep states and power states responsive to resources needed to perform functions associated with the electronic wallet, the electronic wallet further comprising a touch interface and one of the various sleep states comprises a deep sleep state during which the microprocessor scans the touch interface at a first rate, and responsive to sensing a touch event, the microprocessor scans the touch interface at a second rate greater than the first rate.

14. The method of claim 1, wherein the electronic card further comprises a wake-up circuit comprising an antenna receiving a radio frequency signal from a transmitting device to wake up one or more components on the electronic card.

15. The method of claim 1, wherein the step of selecting the selected personal information item comprises the user speaking the alias or typing the alias or making a behavior representing the alias.

16. The method of claim 15, wherein the alias comprises one or more words for selecting the selected personal information item and for authenticating the user.

17. The method of claim 1, wherein one or both of the electronic wallet and the electronic card comprise a display for presenting an alias associated with each of the plurality of personal information items stored on the electronic wallet and the electronic card, the user selecting one of the presented aliases for selecting the selected personal information item.

18. The method of claim 1, wherein the alias comprises at least one of a word, a biometric, a PIN, a password, a pattern, a behavior, a gesture, or a signature stored within a memory of the electronic wallet, the electronic wallet recognizing the alias and selecting the associated selected personal information item.

19. The method of claim 1, wherein authenticating the user to one or both of the electronic wallet and the electronic card comprises dynamically pairing the electronic wallet and the electronic card.

20. The method of claim 1, wherein authenticating the user to one or both of the electronic wallet and the electronic card requires the electronic wallet and the electronic card to be in a proximate relationship to each other.

21. The method of claim 1, further comprising specifying, by the user, a time duration for conducting the transaction.

22. The method of claim 1, wherein the step of authenticating uses one-time-use authentication keys.

23. The method of claim 1, further comprising encrypting the selected personal information item using one-time encryption keys.

24. The method of claim 1, further comprising setting limitations, by the user, on the transaction such that if any of the limitations are exceeded the transaction is not executed.

25. The method of claim 1, wherein the step of authenticating the user comprises storing a biometric identifier or a behavior-metric identifier remote from the electronic wallet and electronic card and using the biometric identifier or the behavior-metric identifier during the step of authenticating the user.

26. The method of claim 1, wherein
pinching the conductive material further performs one or more of turning the card on, turning the card off, waking up the card, and controlling operation of the card.

* * * * *